United States Patent
Korba et al.

(10) Patent No.: US 8,019,484 B2
(45) Date of Patent: Sep. 13, 2011

(54) DAMPING ELECTROMECHANICAL OSCILLATIONS IN POWER SYSTEMS

(75) Inventors: Petr Korba, Turgi (CH); Alexandre Oudalov, Fislisbach (CH); Mats Larsson, Baden (CH); Johan A. Lindberg, Göteborg (SE); Stefan G. Thorburn, Västeras (SE)

(73) Assignee: ABB Research Ltd, Zurich (CH)

( * ) Notice: Subject to any disclaimer, the term of this patent is extended or adjusted under 35 U.S.C. 154(b) by 562 days.

(21) Appl. No.: 12/000,030

(22) Filed: Dec. 7, 2007

(65) Prior Publication Data

US 2008/0177425 A1    Jul. 24, 2008

Related U.S. Application Data

(63) Continuation of application No. PCT/CH2006/000308, filed on Jun. 8, 2006.

(30) Foreign Application Priority Data

Jun. 24, 2005    (EP) .................................... 05405408

(51) Int. Cl.
   *G05D 11/00*    (2006.01)
(52) U.S. Cl. ....................................................... 700/292
(58) Field of Classification Search .................... 700/32, 700/79, 286, 292, 294
   See application file for complete search history.

(56) References Cited

U.S. PATENT DOCUMENTS

| 5,343,139 | A | 8/1994 | Gyugyi et al. | |
| 5,703,791 | A | 12/1997 | Amano et al. | |
| 6,476,521 | B1 * | 11/2002 | Lof et al. | 307/105 |
| 7,149,605 | B2 * | 12/2006 | Chassin et al. | 700/295 |

FOREIGN PATENT DOCUMENTS

EP    1 489 714 A1    12/2004

OTHER PUBLICATIONS

Korba et al; "Detection of Oscillations in Power Systems using Kalman Filtering Techniques"; 2003; IEEE pp. 183-188.*
Hemmingsson et al. "Estimation of Electro-Mechanical Mode Parameters using Frequency Measurements"; 2001; IEEE pp. 1172-1177.*
Hart et al. "PMUs—A new approach to power networks monitoring"; 2001; ABB Review; pp. 58-61.*

(Continued)

*Primary Examiner* — Albert DeCady
*Assistant Examiner* — Chad Rapp
(74) *Attorney, Agent, or Firm* — Buchanan Ingersoll & Rooney PC

(57) ABSTRACT

The present disclosure is concerned with the combined voltage or power flow control and damping of electromechanical oscillations in an electric power system by Flexible AC Transmission System (FACTS) devices or High Voltage DC (HVDC) transmission devices. To this end, information about a state or operating point of the power system is generated from suitable second system signals ($y_2$) and a control parameter (cp) of a FACTS controller is derived therefrom. The control parameter and a first system signal ($y_1$) are used in the calculation of a control command (u) defining the settings of the FACTS device. Following a change in the state of the power system such as a change in the topology of a transmission network, poorly damped or even unstable oscillations are avoided by appropriate re-tuning of the control parameter of the damping or stabilizing equipment.

13 Claims, 3 Drawing Sheets

OTHER PUBLICATIONS

Cai et al.; "Simultaneous Coordinated Tuning of PSS and FACTS Controler for Damping Power System Oscillations in Multi-Machine Systems"; Jun. 2003; Power Tech Conference; IEEE; pp. 1-6.*

Niaki S A N et al: "Application of unified power flow controller (UDFC) for damping interarea oscillations" IEEE/PES Transmission and Distribution Conference and Exhibition 2002: Asia Pacific. Yokohama, Japan, Oct. 6-10, 2002 vol. 1 F 3.

E. Lerch et al. "Advanced SVC control for damping power system oscillations", IEEE Transactions on Power Systems, vol. 6, No. 2, May 1991, pp. 524-535, ISSN: 0885-8950.

International Search Report for PCT/CH2006/000308 dated Sep. 21, 2007.

International Preliminary Report on Patentability and Written Opinion for corresponding PCT/CH2006/000308, dated Aug. 6, 2006.

Larsson et al, ABB Corporate Research,"Improvement of Cross-border trading Capabilities through Wide-area Control of FACTS", Proceedings of Bulk Power System Dynamics and control VI, Aug. 22-27 2004, Cortina D'Ampezzo, Italy, 8 pages.

Johansson et al, "Power System Stability Benefits With VSC DC-Transmission Systems", CIGRE Session 2004, pp. 1-8.

* cited by examiner

DAMPING ELECTROMECHANICAL OSCILLATIONS IN POWER SYSTEMS

RELATED APPLICATIONS

This application claims priority under 35 U.S.C. §119 to U.S. Provisional Patent Application No. 60/688,393 filed on 8 Jun. 2005, European Patent Application No. 05405408.5 filed in the European Patent Office on 24 Jun. 2005 and U.S. Provisional Patent Application No. 60/697,361 filed on 8 Jul. 2005; and claims priority as a continuation application under 35 U.S.C. §120 to PCT/CH2006/000308 filed as an International Application on 8 Jun. 2006 designating the U.S., the entire contents of which are hereby incorporated by reference in their entireties.

TECHNICAL FIELD

The disclosure relates to the field of damping electromechanical oscillations in electric power systems interconnecting a plurality of generators and consumers. It departs from a method of controlling power flow in an electric power system.

BACKGROUND INFORMATION

In the wake of the ongoing deregulations of the electric power markets, load transmission and wheeling of power from distant generators to local consumers has become common practice. As a consequence of the competition between utilities and the emerging need to optimize assets, substantially increased amounts of power are transmitted through the existing networks, invariably causing congestion, transmission bottlenecks and/or oscillations of parts of the power transmission systems. In this regard, electrical transmission networks are highly dynamic, and in response to changing network states, loads or power injected by generating units, the power flow over alternate transmissions paths may need to be redistributed. Such adjustments are made according to the current topology and electrical flow situation of the electrical transmission network, preferably by means of so-called Power Flow Control Devices (PFD). These devices are installed at transmission line stations to adjust power flow in each transmission line, so that power can be guided to flow in a safe, stable and balanced manner in a large number of lines within the electrical transmission network. PFDs in general may comprise mechanical components and their set-points are updated on a time-scale of hours.

By way of example, the unpublished International Patent Application PCT/CH 2005/000125 is concerned with the challenges of power flow management in electrical transmission networks caused by the integration of power systems across several regions with differing price and/or demand levels. PFDs such as a series capacitor, a Phase Angle Regulator, a Phase Shifting Transformer (PST) or a Flexible Alternating Current Transmission System (FACTS) device improve dynamic performance of electrical transmission networks. They are designed to supply reactive power to support voltage and provide stability enhancements, thereby allowing transmission facilities to be loaded to levels approaching their ultimate thermal capacity.

Fast network controllers or Power Flow Control Devices (PFD) which are based on power electronic semiconductor components and which are devoid of mechanical switches enable response times in the millisecond range. They include, among others, the aforementioned Flexible Alternating Current Transmission System (FACTS) devices as well as High Voltage DC (HVDC) devices. HVDC devices comprise power converters or voltage source converters for generating or consuming active power, which converters are based on a multitude of semiconductor components or modules that are individually controlled by control signals produced by gate drives or other control hardware of a converter control unit.

In general, electromechanical oscillations in electric power transmission networks interconnecting several alternating current generators have a frequency of less than a few Hz and are considered acceptable as long as they decay. They are initiated by the normal small changes in the system load, and they are a characteristic of any power system. Frequent but small oscillations may lead to wear and tear of power plant equipment especially governor servo equipment. Insufficiently damped oscillations may occur when the operating point of the power system is changed, e.g. due to a new distribution of power flows following a connection or disconnection of generators, loads and/or transmission lines. Likewise, the interconnection of several existing power grids, even if the latter do not individually present any badly damped oscillations prior to their interconnection, may give rise to insufficiently damped oscillations. In these cases, an increase in the transmitted power of a few MW may make the difference between stable oscillations and unstable oscillations which have the potential to cause a system collapse or result in lost of synchronism, lost of interconnections and ultimately the inability to supply electric power to the customer. Constant monitoring of the power system can help a network operator to accurately assess power system states and avoid a total blackout by taking appropriate actions such as the connection of specially designed damping equipment.

In the Patent Application EP-A 1 489 714, a system quantity or signal such as e.g. the amplitude or angle of the voltage or current at a selected node of the network is sampled, and the parameters of a parametric model representing the behaviour of a power transmission system, or a particular aspect thereof, are estimated. This process is carried out in an adaptive manner, i.e. every time a new value of the system quantity is measured, the parameters of the model are updated recursively. Finally, from the estimated parameters of the model, the parameters of the oscillatory modes are computed, and their oscillation frequency and damping properties are quantified and presented to the operator. This process enables an almost instantaneous analysis of the oscillation state of the power system as compared to a non-adaptive identification process relying on the analysis of sampled data collected over a time-window of several minutes and evaluated only at the end of this time-window.

In the article by M. Larsson et al. "Improvement of Cross-border Trading Capabilities through Wide-area Control of FACTS", Proceedings of Bulk Power System Dynamics and Control VI, 22-27 August, Cortina D'Ampezzo, Italy, 2004, coordination of a multitude of FACTS devices is proposed. A secondary control loop generates the set-points for the primary FACTS controllers, based on global or wide-area information. The latter comprises state snapshots from a wide-area measurement system including a relatively large number of Phasor Measurement Units (PMUs). The subsequent mathematical optimization of the FACTS set-points occurs in real time with respect to loadability criteria, voltage security assessments and/or accurate stability margins.

The article by E. Lerch et al. "Advanced SVC control for damping power system oscillations", IEEE Transactions on Power Systems, Vol. 6, No. 2, May 1991, pages: 524-535, ISSN: 0885-8950, proposes to improve Static Var Compensation (SVC) control by introducing signals which reflect power system oscillations, using phase angle signals estimated from measurements of local state variables (voltage and power) at the location of the Static Var Compensator itself. Maximum damping is achieved by employing bang-bang control and additional filters for eliminating interference signals from the electromechanical oscillation signal having an oscillation frequency known in advance.

The article by S. G. Johansson et al. "Power System Stability Benefit With Vsc Dc-Transmission Systems" in Cigre General session 2004, Paper B4-204, Paris; discusses different aspects of the controllability of a Voltage Source Converter (VSC) HVDC transmission. In particular, the freedom of active and reactive power control for this type of device is illustrated, as well as its impact on the transmission system.

SUMMARY

It is therefore an objective of the disclosure to damp electromechanical power oscillations in electric power transmission networks in a robust manner and with little additional equipment.

A method of controlling power flow in a power system is disclosed, comprising measuring a first system signal (y1), calculating a control command (u) based on the first system signal (y1) and a power flow control parameter (r1), applying the control command (u) to a power electronic semiconductor based Power Flow Control Device (PFD) for controlling power flow in the power system, repeatedly measuring a second system signal (y2), adaptively determining a power oscillation control parameter (cp) based on the second system signal (y2), calculating the control command (u) based on the power oscillation control parameter (cp), and applying the control command (u) to the PFD (20) for damping electromechanical oscillations in the power system.

A control arrangement is disclosed, comprising: a controller for controlling power flow and damping electromechanical oscillations in a power system by applying a control command (u) to a power electronic semiconductor based Power Flow Control Device (PFD), wherein the control command (u) is calculated based on a first system signal (y1) and a power flow control parameter (r1); and a parameter adapter for adapting a power oscillation control parameter (cp) based on a second system signal (y2). The controller comprises a power oscillation damper for calculating the control command (u) based on the control parameter (cp).

BRIEF DESCRIPTION OF THE DRAWINGS

The subject matter of the disclosure will be explained in more detail in the following text with reference to exemplary embodiments which are illustrated in the attached schematical drawings, of which.

The reference symbols used in the drawings, and their meanings, are listed in summary form in the list of reference symbols. In principle, identical parts are provided with the same reference symbols in the figures.

DETAILED DESCRIPTION

Figure 1:
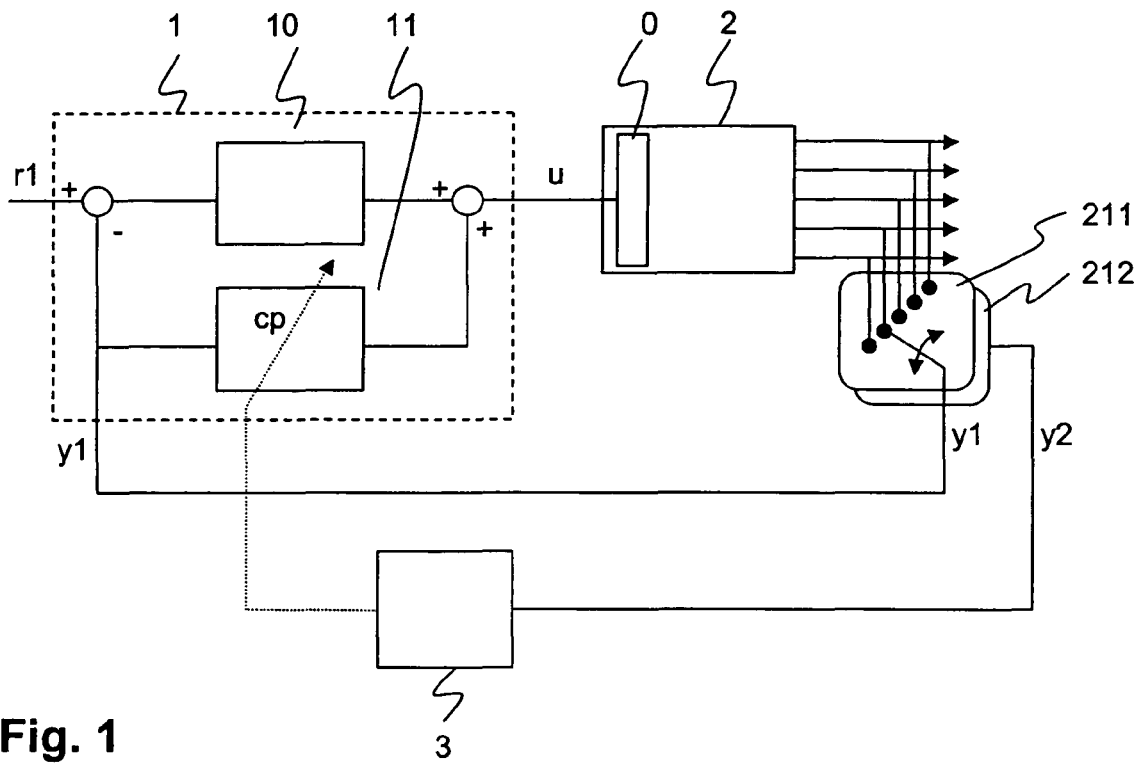
FIG. 1 shows a power system control environment according to the disclosure.

According to the disclosure, voltage or power flow control in an electric power system is performed or executed in conjunction with power oscillation damping by Power Flow Control Devices (PFD) or similar equipment based on fast acting power electronic semiconductor components. In other words, the latter is concurrently controlled in view of both damping of electromechanical oscillations as well as controlling power flow. To this end, information about a system state or system operating point is generated from suitable second system signals, system quantities or system output variables. From this information, a power oscillation control parameter or operation point of a PFD controller is derived. The power oscillation control parameter and a first system signal or control input are then used in the calculation of a control command, control output or system input variable defining the settings of the PFD. The power oscillation control parameter represents additional feedback information from the power system that is fed to the PFD controller in addition to a conventional power flow control parameter or PFD controller set-point to which the first system signal is generally compared.

The state of a power system comprising a transmission network, i.e. its operating point, depends on the status of a multitude of network elements such as breakers and lines, i.e. the actual topology of the network, as well as on current and power flows throughout the network, i.e. the actual electrical parameters of the network. In case of contingencies, changed operating points can cause poorly damped or even unstable oscillations since the set of control parameters yielding satisfactory damping for one operating point may no longer be valid for another one. A changing operating point or a new system state of the power system is taken into account by the present disclosure by appropriately re-tuning the power oscillation control parameters in an adaptive manner. This ultimately enhances the robustness of the power system stabilizing procedure as compared to a static determination of the power oscillation control parameters.

In a first exemplary embodiment of the disclosure, the information about the network state is regularly determined and the power oscillation control parameter adaptively determined or updated at least at the frequency of the expected changes in system operating points, e.g. every 5 sec. This ensures that the power oscillation damping control is as effective as possible at any time. As a new value of a set-point of the concurrent power flow control generally leads to changed operating conditions, this also implies a short delay between the latest change in said set-point and the next regular update of the power oscillation control parameter.

In a second exemplary embodiment of the disclosure, the second system signals are provided as time-stamped phasor signals by phasor measurement units (PMUs) at a rate of typically 10 Hz or more. The adaptive determination of the power oscillation control parameter in this case is then taking place at a similar rate. Alternatively, as detailed in the foregoing, the update of the latter parameters occurs at a reduced rate specified in advance or during operation according to the actual slowness/fastness of the time-varying power system.

The finding that even a single phasor signal allows to derive the necessary information about the operating point of the power system offers an unprecedented flexibility in the choice of the location of the PMU. Accordingly, there is no need to operate with second system signals measured at the location of the PFD itself. In particular, the PMU may be placed at, or the phasor signal may be chosen to originate from, a suitably selected node of the power system, which considerably enhances the accuracy of the proposed procedure.

In an exemplary embodiment of the disclosure, the updated power oscillation control parameters are derived from a model of the network characterized by actual values of model parameters. The latter may be part of a complete system model that is arbitrarily complex and provides an accurate picture of the behaviour of the power system including its responses to control commands, and thus enables a model-based control. On the other hand, the model parameters may be first compressed into oscillation parameters such as frequency and damping of the dominant or least-damped power oscillation. This considerably simplifies the subsequent deduction of the actual power oscillation control parameter values.

Although this discussion focuses on Flexible Alternating-Current Transmission Systems (FACTS) devices, it has to be noted that VSC High Voltage DC (HVDC) transmission devices in different configurations also function as fast control devices and are equally well suited for the purposes of the present disclosure.

FIG. 1 depicts a controller 1 for a Power Flow Control Device (PFD) comprising a steady-state regulator 10 for set-point tracking and/or power flow control, as well as a Power Oscillation Damper (POD) 11. The controller 1 generates and issues a control command u that determines the settings of a PFD or FACTS device 20, which in turn acts on a power system 2. From a multitude of observable system quantities y characterizing the power system 2, selectors 211 and 212 select a first and a second system signal $y_1$ and $y_2$, respectively. The difference between the first system signal $y_1$ and a corresponding set-point $r_1$ is fed to the steady-state regulator 10 that is responsible e.g. for optimizing the transmission capability of the power system 2 and minimizing the operational costs through slow set-point tracking of quantities such as voltage or power flow. The properly selected second system signal $y_2$ is fed to parameter adaptor 3 and analysed on-line by the latter. The parameter adaptor 3 determines in real-time the necessary information about a present state of the power system 2. This information is exploited to adapt on-line at least one control parameter cp of the POD 11 in order to improve damping of electromechanical oscillations in the power system 2.

Exemplary FACTS devices suitable for the proposed fast control consist of power semiconductor components and include, by way of example, Static-Var Compensators (SVCs), Unified Power Flow Controller (UPFC), Thyristor-Controlled Series Capacitors (TSCSs), thyristor controlled phase-shifting transformers (TCPST), impedance modulators, and series compensation capacitors. The double functionality of the power system controller 1 is generally implemented as a computer program executed by the controller's hardware, with the steady-state regulator 10 and Power Oscillation Damper (POD) 11 involving different algorithms. The second system signal Y2 can be chosen depending on the observability of the dominant power oscillation mode, and thus is generally different from the first system signal $y_1$. The latter is typically local, i.e. measured at the place of the controller 1 itself, whereas the second system signal $y_2$ can be remote, i.e. measured at a node selected by selector 212 that is in a remote place of the power system 2 far away from the controller 1. By way of example, a Wide Area Monitoring and Control (WAMC) system includes Phasor Measurement Units (PMUs) that do provide remote system signals y as detailed in the following. In a typical implementation, phasor data $y_2$ is determined at least every 100 milliseconds, however the control parameter cp is updated less frequently, depending on the hardware platform used and the computational power invested. The set-point $r_1$ is typically updated every quarter of an hour or less.

Figure 2:
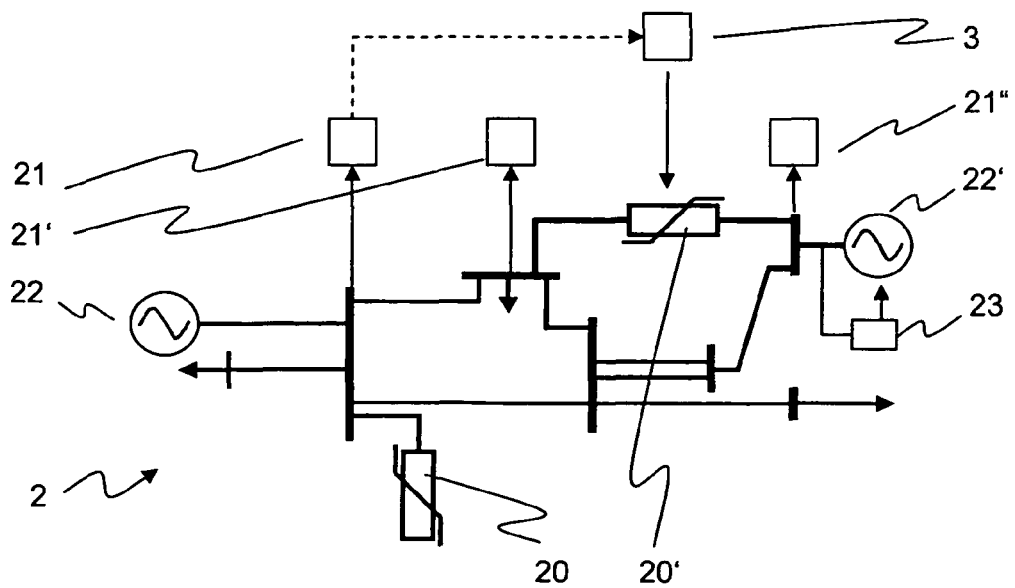
FIG. 2 depicts a power system with two FACTS devices.

FIG. 2 shows an overview of a power system 2 comprising a power transmission network (thick lines), two FACTS devices 20, 20', two generators 22, 22' as well as a Wide Area Monitoring (WAM) system. The exemplary FACTS devices comprise a Static-Var Compensator (SVC) 20 representing a variable admittance and a Thyristor-Controlled Series Capacitor (TCSC) 20'. The WAM system comprises three phasor measurement units (PMUs) 21, 21', 21" residing, for example, at a feeder at the bay level of substations or at branching points along transmission lines of the power system. The PMUs provide fast sampled phasor snapshots of the power system in the form of magnitudes or phase angles of system quantities y such as voltages or currents. These signals are transmitted and collected centrally in a wide-area monitoring centre (not depicted) connected to selector 212 and parameter adaptor 3. A power system stabilizer (PSS) 23 is also depicted in proximity to generator 22' and provides feedback to the generator's controller based on a local state of the power system. However, PSS 23 is not capable of detecting inter-area electromechanical oscillations across the transmission network.

Figure 3:
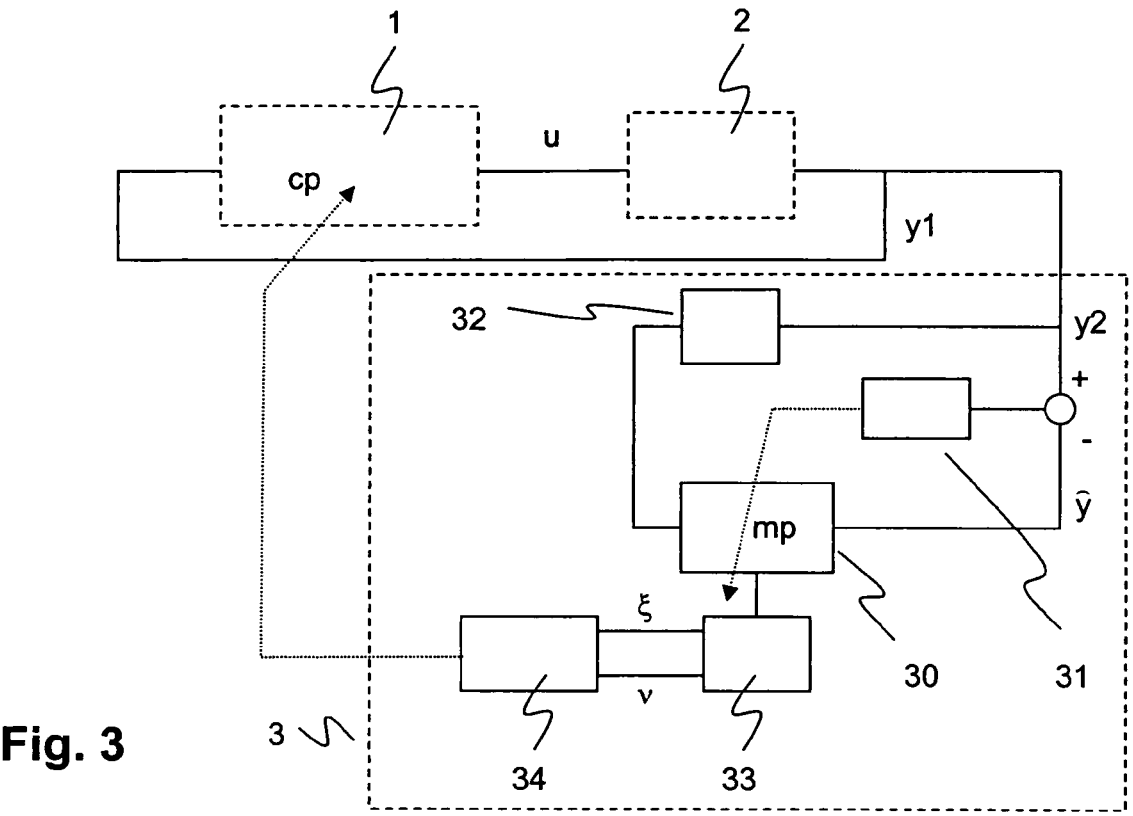
FIG. 3 illustrates a direct adaptive control method via oscillation parameter determination.

FIG. 3 depicts a so-called "direct" adaptive control to improve damping of power system oscillations based on a real-time algorithm for the monitoring of oscillations as described in the aforementioned European Patent Application EP-A 1 489 714, the disclosure of which is incorporated herein by all purposes by way of reference. This algorithm produces in real-time the necessary information about the present system state, and in particular the actual damping $\xi$ and frequency $\nu$ of the dominant power oscillation mode, i.e. the mode with the lowest relative damping ratio. This information is used directly to adapt on-line the control parameters cp so that the power oscillation identified tends to vanish. The corresponding control parameter adaptor 3 includes a model estimator 30 for estimating a linear model of the power system 2 with at least one model parameter mp. The value of the latter is on-line adapted by means of Kalman filter techniques, in order for the power system model to predict values $\hat{y}$ of the second system signal that approximate the measured values $y_2$ optimally in the sense of a quadratic criterion. Any difference between the predicted and measured signals is exploited by model parameter adapter 31 and results in an update of the model parameters mp. In other words, a recursive calculation of the estimated model parameter mp(t) for each time-step t is based on the new value of the measured signal $y_2(t)$ and the previous value of the estimated model parameter mp(t−1), wherein a time-delay element 32 prevents the new value of the measured signal $y_2(t)$ from instantaneously being forwarded to the model estimator 30.

The updated or adapted model parameters mp are then the basis for the extraction or calculation of the oscillation parameters $\xi$, $\nu$ of the dominant oscillation mode by oscillation parameter extractor 33. The oscillation parameters are finally converted into adapted control parameters cp by parameter converter 34 based on appropriate logics and/or rules as detailed below. The update period of the parameters mp, cp is specified in advance or during operation according to how often the state of a transmission network, i.e. its operating point, varies. For instance, an update every 5 sec instead of once per signal sampling time which is typically 0.1 sec may be sufficient, provided that the control commands u are issued at the same or an even lower rate.

Details of the control parameter adaptation are to be found in the article "Application of FACTS Devices for Damping of Power System Oscillations", by R. Sadikovic et al., proceedings of the Power Tech conference 2005, Jun. 27-30, St. Petersburg RU, the disclosure of which is incorporated herein for all purposes by way of reference. The article addresses the selection of the proper feedback signals and the subsequent adaptive tuning of the parameters of a power oscillation damping (POD) controller in case of changing operating conditions. It is based on a linearized system model, the transfer function G(s) of which is being expanded into a sum of N residues:

$$G(s) = \sum_{i=1}^{N} \frac{R_i}{(s - \lambda_i)}$$

The N eigenvalues $\lambda_i$ correspond to the N oscillation modes of the system, whereas the residue $R_i$ for a particular mode gives the sensitivity of that mode's eigenvalue to feedback between the output y and the input u of the system. When a feedback control H(s) is applied, the eigenvalues $\lambda_i$ of the initial system G(s) are shifted, whereby this shift caused by the controller is proportional to the residue $R_i$. For optimal damping improvement, the change of the eigenvalue must be directed towards the left half complex plane. From the desired shifted eigenvalue location $\lambda_{i,des}$, a controller gain K can thus be computed that is inversely proportional to the residue $R_i$. In the notation of the present disclosure, feedback control H and system G correspond to controller 1 and power system 2.

Figure 4:
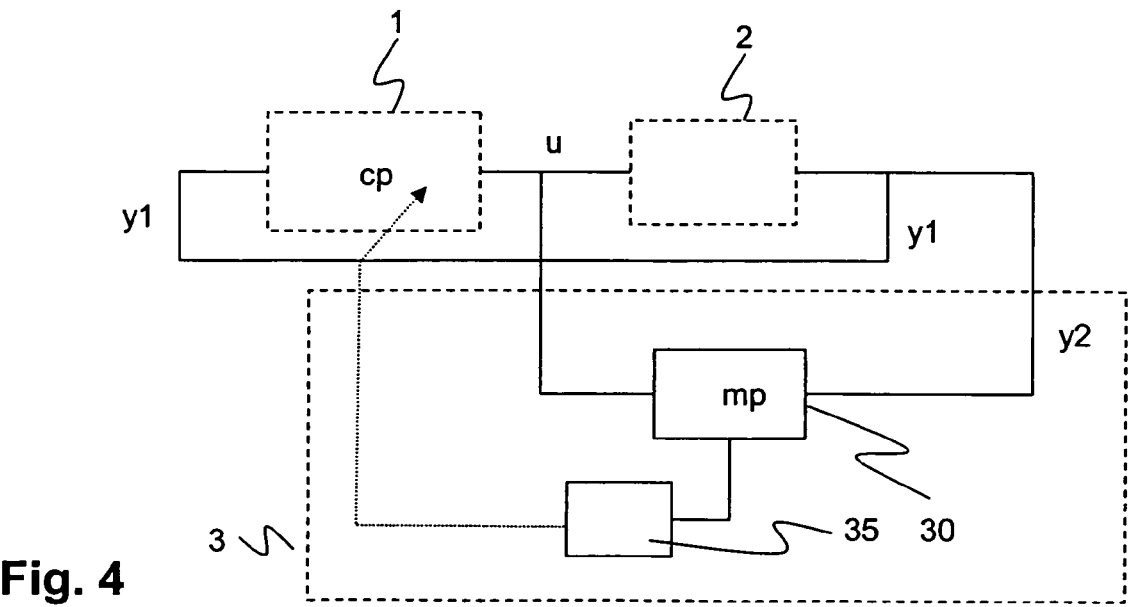
FIG. 4 illustrates an indirect adaptive control method via model-based controller design, FIG. 5 reports a power flow simulation in a test line with and without POD control, and FIG. 6 reports a power flow simulation with and without adapted POD control parameters.

FIG. 4 shows the so-called "indirect" adaptive control. The model estimator 30 of the adaptor 3 is provided with an additional input channel for the actual control command u. This allows estimating a complete and arbitrarily exact dynamic model of the power system 2 including the relationship between control commands u and system signals y, i.e. the actual behaviour of the power system under control between u and y. With this information, the complete system model can be used on-line in a model-based design procedure carried out by a controller designer 35 and can involve a linearization of the complete model around a new operating point. The controller designer 35 finally determines the control parameters cp. Details of this control parameter adaptation scheme are to be found in the article "Self-tuning Controller for Damping of Power System Oscillations with FACTS Devices", by R. Sadikovic et al., Proceedings of the IEEE PES General Meeting 2006, Jun. 18-22, Montreal Calif., the disclosure of which is incorporated herein for all purposes by way of reference.

Figure 5:
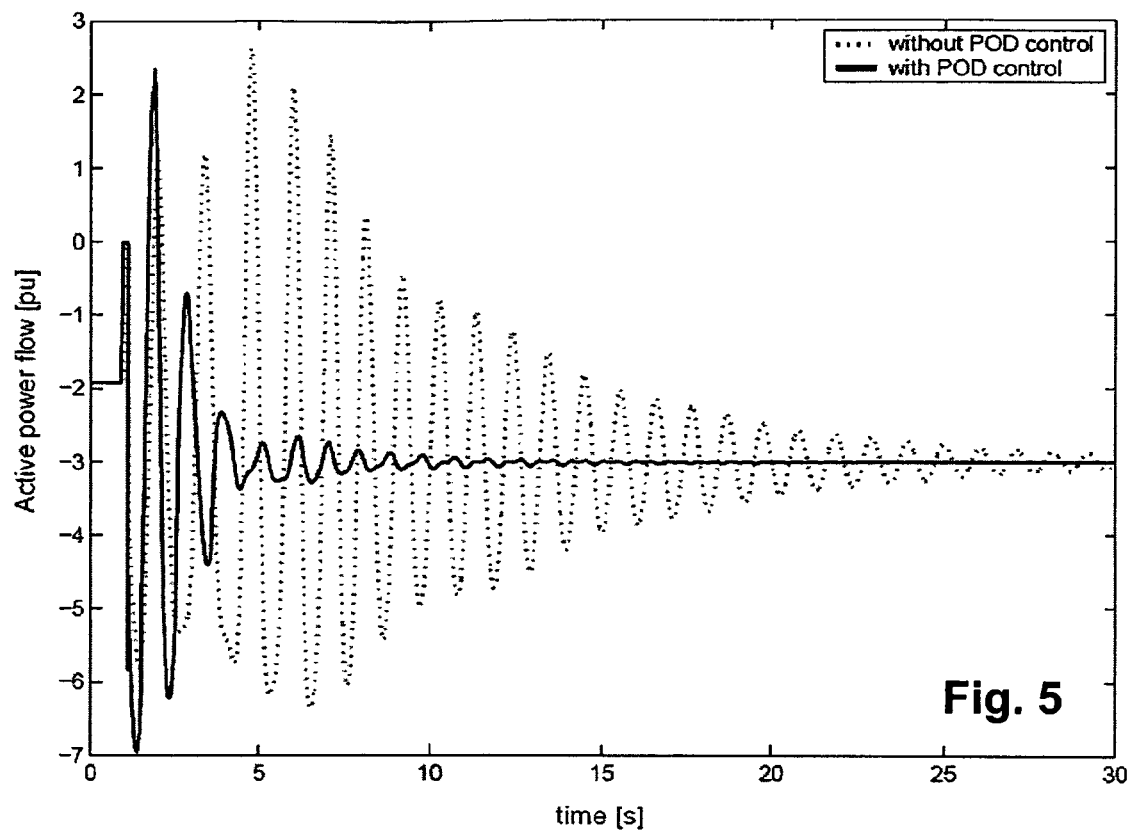

FIG. 5 shows an active power flow over a period of 30 seconds in a certain test line of a power system configuration based on an existing real-world network and thus somewhat more complex than the one depicted in FIG. 2. The simulation shows the active power flow response after a three phase fault is applied at t=1 second to a neighbouring line which is cleared after 100 ms, both with (solid line) and without (dashed line) POD control. The controlled FACTS actuator is a thyristor controlled series compensator (TCSC). It is obvious that the oscillation of active power flow at approximately 1 Hz is damped much faster with the POD control than without.

Figure 6:
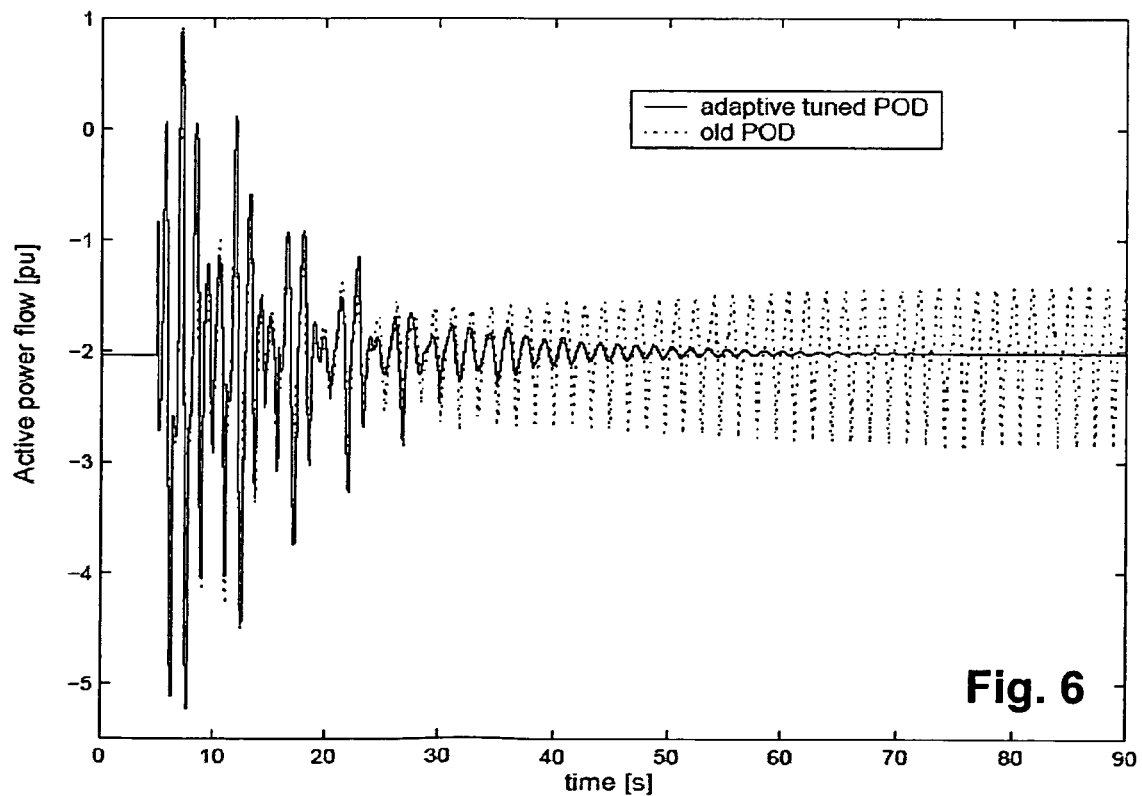

FIG. 6 finally illustrates the effectiveness of the proposed procedure. The simulation depicted corresponds to a situation with POD control in the power system of FIG. 5, but at a slightly changed operation point related to a different network topology caused by a third line being out of service. Again, a three phase fault is applied to a neighbouring line of the test line and the active power flow in the test line is reported for a period of 90 seconds. The previous or old value of the control parameter cp in this case does not lead to a damping of the oscillation (dashed line). On the other hand, if the control parameter cp is adaptively tuned and adopts a new value following the change in network topology, a satisfactory damping of the power oscillation is achieved (solid line).

The disclosure is likewise directed to a method of controlling a power system (2), comprising the steps (a) to (g) of (a) measuring a first system signal ($y_1$), (b) calculating a control command (u) based on the first system signal ($y_1$), and (c) applying the control command (u) to a Flexible AC Transmission System (FACTS) device (20) for controlling power flow in the power system (2), (d) measuring a second system signal ($y_2$), (e) determining a control parameter (cp) based on the second system signal ($y_2$), (f) calculating the control command (u) based on the control parameter (cp), and (g) applying the control command (u) to the FACTS device (20) for damping electromagnetic oscillations in the power system (2).

The calculation of the control command (u) can be based on a difference between the first system signal ($y_1$) and a set-point ($r_1$), and the determination of the control parameter (cp) is repeated at least as frequent as the set-point ($r_1$) is updated. The method comprises measuring the second system signal ($y_2$) by a remote phasor measurement unit (PMU).

It is obvious to the skilled person that the present invention that has been explained in the foregoing with reference to exemplary embodiments may encompass more than one control parameter as well as more than one model parameter for any reasonable control of a non-trivial power system.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF DESIGNATIONS 1 controller
10 steady-state regulator
11 power oscillation damper
2 power system
20, 20' FACTS device
21, 21', 21" phasor measurement unit
211, 212 selector
22, 22' generator
23 power system stabilizer
3 parameter adapter
30 model estimator
31 model parameter adaptor
32 time delay element
33 oscillation parameter extractor
34 parameter converter
35 controller designer

What is claimed is:
1. A method of controlling power flow in a power system, comprising
    measuring a first system signal ($y_1$),
    calculating a control command (u) based on the first system signal ($y_1$) and a power flow control parameter ($r_1$)
    applying the control command (u) to a power electronic semiconductor based Power Flow Control Device (PFD) for controlling power flow in the power system,
    repeatedly measuring a second system signal ($y_2$), adaptively determining a power oscillation control parameter (cp) based on the second system signal ($y_2$), calculating the control command (u) based on the power oscillation control parameter (cp), and applying the control command (u) to the PFD (20) for damping electromechanical oscillations in the power system.

2. The method according to claim 1, wherein the calculation of the control command (u) is based on a difference between the first system signal ($y_1$) and a set-point ($r_1$) of the PFD as the power flow control parameter, wherein the method comprises adaptively determining the power oscillation control parameter (cp) at least at a frequency characteristic of changes of an operating point of the power system.

3. The method according to claim 2, comprising repeatedly measuring, by a phasor measurement unit, a time stamped phasor signal as the second system signal (y2), and adaptively determining the power oscillation control parameter (cp) whenever a phasor measurement is made.

4. The method according to claim 1, comprising:

repeatedly measuring, by a phasor measurement unit, a time stamped phasor signal as the second system signal ($y_2$), and adaptively determining the power oscillation control parameter (cp) whenever a phasor measurement is made.

5. The method according to claim 4, wherein the determination of the power oscillation control parameter (cp) involves determining a model parameter (mp) of a model of the power system (2) from the second system signal (y2).

6. The method according to claim 1, wherein the determination of the power oscillation control parameter (cp) involves determining a model parameter (mp) of a model of the power system from the second system signal ($y_2$).

7. The method according to claim 6, wherein the determination of the power oscillation control parameter (cp) involves determining oscillation parameters ($\xi$, v) of a dominant power oscillation mode from the model parameter (mp).

8. The method according to claim 6, wherein the determination of the model parameter (mp) from the second system signal ($y_2$) comprises generating a series of measured values ($y_2$, $y_2'$, ... ) of the second system signal ($y_2$), estimating model parameters (mp) of a parametric model from said series, and updating said parameters (mp) every time a new value of the second system signal ($y_2$) is measured.

9. A control arrangement comprising: a controller for controlling power flow and damping electromechanical oscillations in a power system by applying a control command (u) to a power electronic semiconductor based Power Flow Control Device (PFD), wherein the control command (u) is calculated based on a first system signal ($y_1$) and a power flow control parameter ($r_1$); and a parameter adapter for adapting a power oscillation control parameter (cp) based on a second system signal ($y_2$), wherein the controller comprises a power oscillation damper for calculating the control command (u) based on the control parameter (cp).

10. The control arrangement according to claim 9, wherein the PFD is a Flexible AC Transmission System (FACTS) device or a High Voltage DC (HVDC) device.

11. The control arrangement according to claim 10, comprising a Phasor Measurement Unit (PMU) for measuring the second system signal ($y_2$) at a location of the power system that is remote from the location of the PFD.

12. The control arrangement according to claim 10, wherein the parameter adapter comprises a model estimator for determining a model parameter (mp) of a model of the power system based on the second system signal ($y_2$), and means for determining the control parameter (cp) from the model parameter (mp).

13. A computer for controlling power flow and damping electromechanical oscillations in a power system, comprising:

a processor; and an internal memory loaded with a computer program, wherein the computer program causes the processor to execute the functions of:

controlling power flow and damping electromechanical oscillations in a power system by applying a control command (u) to a power electronic semiconductor based Power Flow Control Device (PFD);

adapting a power oscillation control parameter (cp) based on a second system signal ($y_2$); and calculating the control command (u) is calculated based on a first system signal ($y_1$), a power flow control parameter ($r_1$), and the control parameter (cp).

* * * * *